United States Patent
St. Ours et al.

(10) Patent No.: US 8,102,136 B2
(45) Date of Patent: Jan. 24, 2012

(54) SIMULTANEOUS ZERO VERIFICATION FOR MOTORS IN A PRINTING PRESS

(75) Inventors: Joseph Adrian St. Ours, Lee, NH (US); Brian Patrick Caven, Dover, NH (US); Kevin Lauren Cote, Allen, TX (US)

(73) Assignee: Goss International Americas, Inc., Durham, NH (US)

( * ) Notice: Subject to any disclaimer, the term of this patent is extended or adjusted under 35 U.S.C. 154(b) by 642 days.

(21) Appl. No.: 12/284,823

(22) Filed: Sep. 25, 2008

(65) Prior Publication Data

US 2010/0072936 A1    Mar. 25, 2010

(51) Int. Cl.
*H02P 1/54*    (2006.01)

(52) U.S. Cl. ............. 318/625; 318/51; 318/101

(58) Field of Classification Search .......... 318/41, 318/51, 62, 101, 625
See application file for complete search history.

(56) References Cited

U.S. PATENT DOCUMENTS

| | | | |
|---|---|---|---|
| 2,944,644 A | | 7/1960 | Sandgren et al. |
| 3,702,587 A * | 11/1972 | Lee ............... 101/207 |
| 4,193,345 A * | 3/1980 | Schoneberger et al. ...... 101/365 |
| 4,334,471 A * | 6/1982 | Noyes et al. ............... 101/228 |
| 4,437,403 A * | 3/1984 | Greiner ............... 101/248 |
| 4,992,731 A * | 2/1991 | Lorenzen ............... 324/174 |
| 5,327,833 A * | 7/1994 | Danielson ............... 101/484 |
| 5,379,211 A * | 1/1995 | McVenes ............... 700/124 |
| 5,816,151 A * | 10/1998 | Wang et al. ............... 101/171 |
| 6,408,747 B2 | 6/2002 | Hajek et al. |
| 6,642,506 B1 | 11/2003 | Nahum et al. |
| 6,977,594 B2 * | 12/2005 | Hudman et al. .......... 340/686.1 |
| 7,044,058 B2 | 5/2006 | Richards |
| 2005/0000380 A1 | 1/2005 | Richards |
| 2005/0263688 A1 | 12/2005 | Kauhanen |
| 2005/0284318 A1 | 12/2005 | Hajek et al. |
| 2006/0100723 A1 | 5/2006 | Sun et al. |

\* cited by examiner

*Primary Examiner* — Bentsu Ro
(74) *Attorney, Agent, or Firm* — Davidson, Davidson & Kappel, LLC

(57) ABSTRACT

A method for determining accuracy of an actual position of a plurality of independent motors in a printing press is provided. The method includes commanding each of the plurality of motors in the printing press via a controller to move a desired initial position, comparing an actual position of each motor to the desired initial position of each motor, determining if the actual position of each motor is within a predetermined tolerance of the desired initial position, and resetting any motor outside the predetermined tolerance to be within the predetermined tolerance. A printing press is also provided. The printing press includes a plurality of printing press components and a plurality of motors. Each motor drives at least one of the printing press components and each of the motors has a desired initial position. The printing press also includes a position detector for determining an actual position of the motor with respect to the desired initial position of the motor.

20 Claims, 4 Drawing Sheets

FIG. 5 shows a further preferred embodiment of a motor shown in FIG. 1; and

FIG. 6 shows a flow chart according to the present invention;

SIMULTANEOUS ZERO VERIFICATION FOR MOTORS IN A PRINTING PRESS

BACKGROUND

The present invention relates to printing presses and more specifically to multi-drive printing presses including folders and folder superstructures.

U.S. Pat. No. 2,944,644 discloses each of the individual printing press units and folder units having its own drive motor, and the main drive shafts, or preferably the motor shafts themselves, are all aligned and are provided with clutch mechanisms that permit a mechanical connection between at least one folder drive and a selected number or group of press unit drives to mechanically secure synchronism of all press units co-operating with the folder upon a single web of paper.

U.S. Pat. No. 6,408,747 discloses the drive for a printing machine. Angle control of the electric motors is performed by computer motor controls within the framework of the machine control system. Accordingly, the electric motors are connected to the machine control system.

U.S. Pat. No. 7,044,058 discloses a method for presetting motor phase in a web printing press. Initial motor phase can be determined or refined through operator-experience for a particular job, and noted or stored in any manner and then provided to the plate or image making equipment. The controller may control the first and second drive motors in synchronous fashion, even though the drive motors are independent. The controller also can receive an input from the folder or other press components. The input for example can provide a zero or other reference position indicating the cut position of the webs. The desired print position for each web can be based on this reference.

BRIEF SUMMARY OF THE INVENTION

The present invention provides a method for determining accuracy of an actual position of a plurality of independent motors in a printing press. The method includes commanding each of the plurality of motors in the printing press via a controller to move a desired initial position, comparing an actual position of each motor to the desired initial position of each motor, determining if the actual position of each motor is within a predetermined tolerance of the desired initial position, and resetting any motor outside the predetermined tolerance to be within the predetermined tolerance.

The present invention further provides a printing press. The printing press includes a plurality of printing press components and a plurality of motors. Each motor drives at least one of the printing press components and each of the motors has a desired initial position. The printing press also includes a position detector for determining an actual position of the motor with respect to the desired initial position of the motor.

BRIEF DESCRIPTION OF THE DRAWINGS

A preferred embodiment of the present invention will be elucidated with reference to the drawings, in which.

DETAILED DESCRIPTION OF PREFERRED EMBODIMENTS

Figure 1:
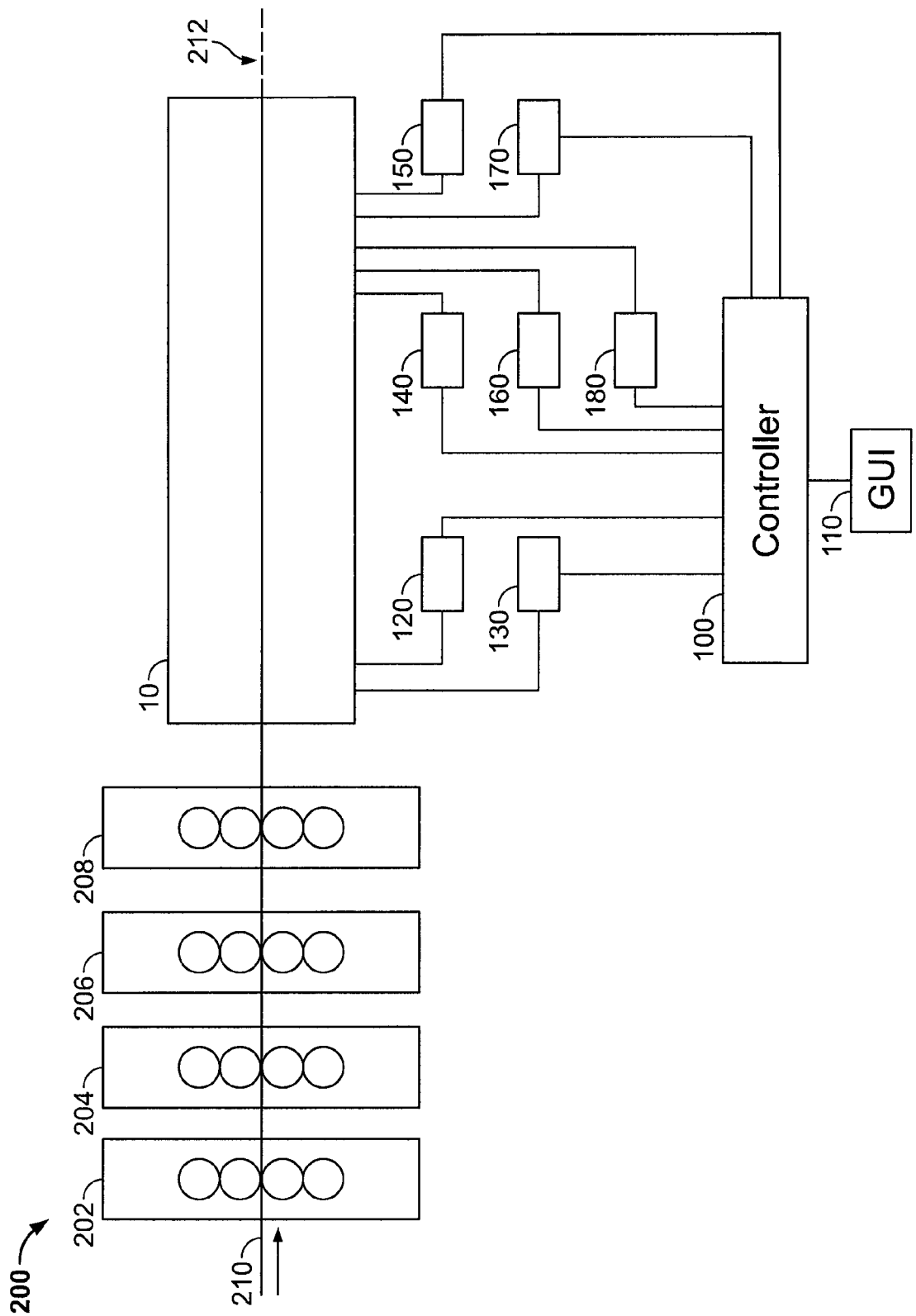
FIG. 1 shows a printing press according to a preferred embodiment of the present invention.

FIG. 1 shows a web 210 traveling through a printing press 200, printing press 200 including a plurality of printing units 202, 204, 206, 208 and a folder 10. Folder 10 includes a plurality of press components being driven by motors 120, 130, 140, 150, 160, 170, 180 in accordance with a preferred embodiment of the present invention. Folder 10 folds and cuts web 210 into printed products 212. Motors 120, 130, 140, 150, 160, 170, 180 are connected to a controller 100. Controller 100 is connected to a graphic user interface (GUI) 110.

Figure 2:
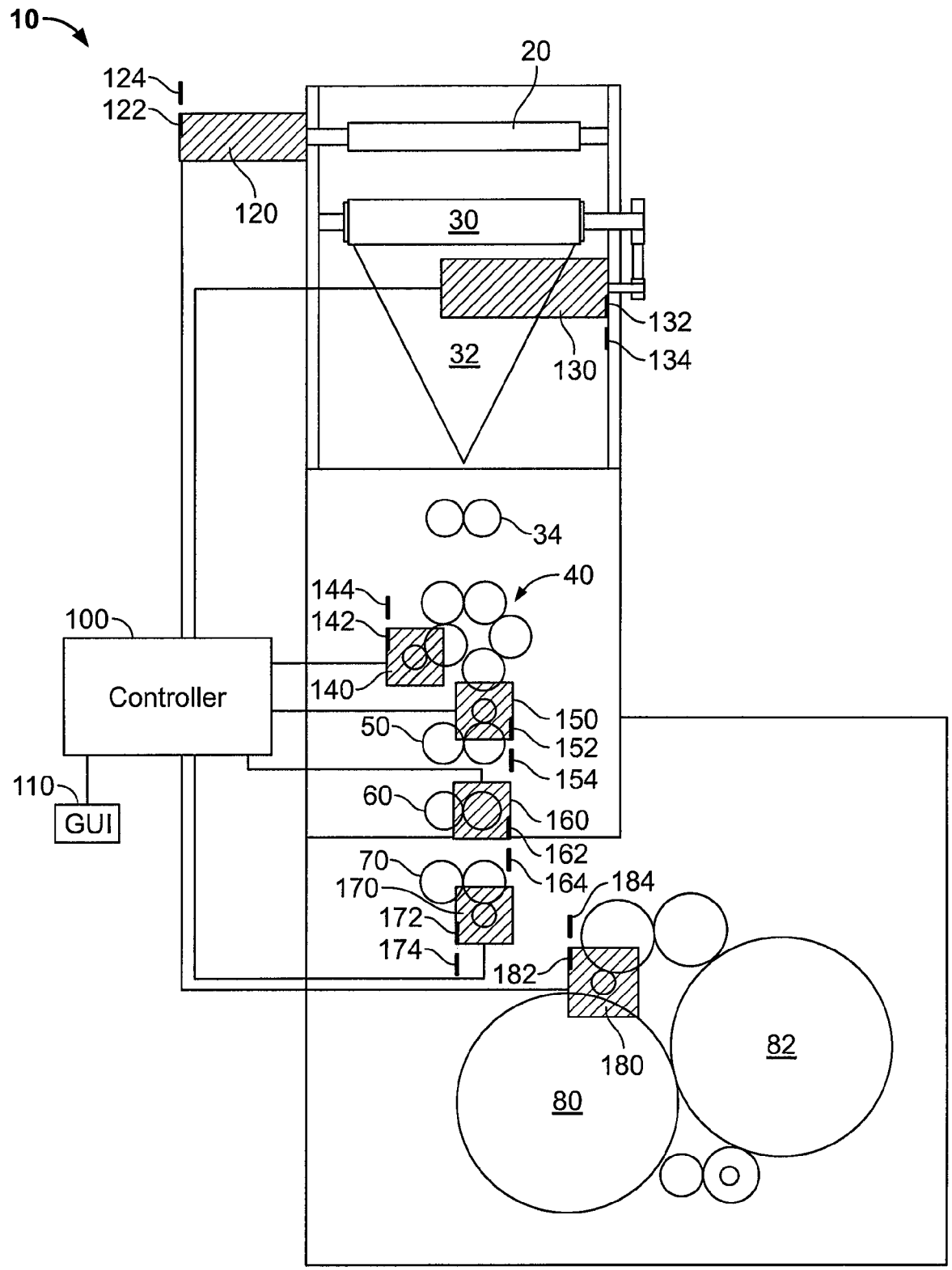
FIG. 2 shows a folder and folder superstructure with multiple motors according to the preferred embodiment of the present invention shown in FIG. 1.

As shown in FIG. 2, folder 10 includes a plurality of press components, including a pull roller 20, a roll top of former (RTF) 30 and a former 32. Motor 120 drives pull roller 20 and motor 130 drives RTF 30. Downstream of RTF 30 are upper nip rollers 34 and cross perforation and crease cylinders 40. Motor 140 drives cross perforation and crease cylinders 40. Further downstream, motor 150 drives a first cutting cylinder pair 50. Motor 160 drives upper and lower nip rollers 34, 60 and a motor 170 drives a second cutting cylinder pair 70. A motor 180 drives tucker cylinder 80. Folder 10 also includes a jaw cylinder 82. As shown in FIGS. 1 and 2, web 210 enters folder 10 and is longitudinally folded by former 32, cut by cylinder pairs 50, 70 and folded further by jaw cylinder 82 to form printed products 212.

A multi-drive machine such as printing press 200 may include independent centers that require synchronization. These independent centers may correspond to select motors and/or press components. Each independent center has a desired initial position. The desired initial position may include a mechanical component as well as an electrical component.

In FIG. 2, the independent centers for synchronized operation include motors 120, 130, 140, 150, 160, 170, 180. Each motor 120, 130, 140, 150, 160, 170, 180 has a desired, initial position including a mechanical zero an electrical zero. The mechanical zero position defines the electrical zero for each motor. The mechanical zero may be a desired position of the motor before the motor begins driving a press component. For example, the mechanical and electrical zeros may be a predetermined position in the operational cycle or phase of the motor. The desired, initial position for each motor 120, 130, 140, 150, 160, 170, 180 may be stored in controller 100.

Establishing a desired initial position for each motor 120, 130, 140, 150, 160, 170, 180 helps ensure proper synchronization. If there is any change in the mechanical zero, for example, mechanical slipping, performance of the printing press may suffer, and the electrical zero may not correspond to the mechanical zero. An operator can check actual positions of motors 120, 130, 140, 150, 160, 170, 180 to ensure motors 120, 130, 140, 150, 160, 170, 180 are set at the desired initial position or within an acceptable tolerance, thereby avoiding unnecessary and time consuming re-zero efforts. The desired initial positions may be checked when, for example, a problem with the desired initial position is suspected or as a preventative maintenance check.

The operator may compare the actual position of each motor 120, 130, 140, 150, 160, 170, 180 to the desired initial position of each motor stored in controller 100. One or a plurality of position detectors may be used. The position detectors may include, for example, a position marker on a motor or press component and a stationary reference marker. In a preferred embodiment shown in FIGS. 2 and 3, each motor 120, 130, 140, 150, 160, 170, 180 has a position detector which includes a position marker 122, 132, 142, 152, 162, 172, 182 aligned with a reference marker 124, 134, 144, 154, 164, 174, 184 when each motor 120, 130, 140, 150, 160, 170, 180, respectively, is in the desired initial position. Each position marker 122, 132, 142, 152, 162, 172, 182 moves with each motor 120, 130, 140, 150, 160, 170, 180, respectively, as each motor 120, 130, 140, 150, 160, 170, 180 drives one of the printing press components. The position markers 122, 132, 142, 152, 162, 172, are an actual mark on each motor 120, 130, 140, 150, 160, 170, 180 that is visible to a printing press operator for example, a scribed line, a decal, or another machined feature on the motor. Thus, an operator can check the actual position of the motor by comparing the location of positioner 122, 132, 142, 152, 162, 172 a with reference marker 124, 134, 144, 154, 164, 174, 184.

Figure 3:
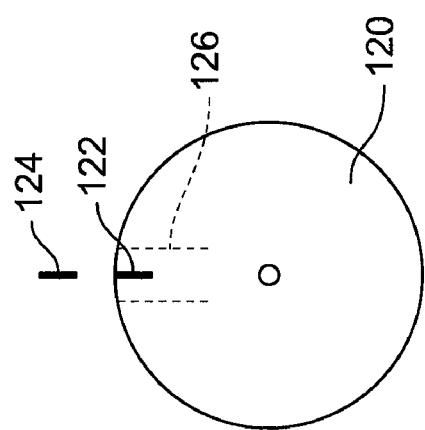
FIG. 3 shows a motor shown in FIG. 2.

For example, if an operator wants to check the initial position of motor 120, the operator will command motor 120 via GUI 110 and controller 100 to move to the desired initial position. The operator may visually inspect position marker 122 and reference marker 124 to determine if marker 122 and reference marker 124 are in proper alignment or within an acceptable tolerance 126 as shown in FIG. 3. If position marker 122 and reference marker 124 are aligned, motor 120 is in the desired initial position. If motor 120 is not in the desired initial position, motor 120 may be adjusted accordingly. Motor 120 may be adjusted manually, for example, by an operator, automatically, via controller 100, or a combination of both manual and automatic adjustments may be made.

Figure 4:
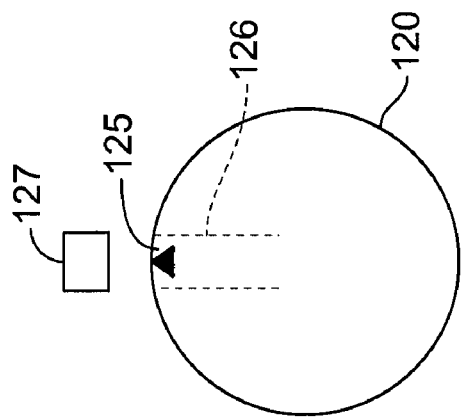
FIG. 4 shows an additional preferred embodiment of a motor shown in FIG. 2.

FIG. 4 shows a further preferred embodiment including a position detector having a proximity sensor 127 and a flag 125. Proximity sensor 127 is installed to work with flag 125 attached to a moving part of motor 120. In this embodiment, flag 125 moves as motor 120 drives a press component. When a check is desired, the operator initiates the check and commands motor 120 to move to the desired initial position. Proximity sensor 127 detects flag 125 as flag rotates 125 near proximity sensor 127 and sends a signal to controller 100. Controller 100 determines if flag 125 is within an acceptable tolerance 126 of the desired initial position. If the actual position of motor 120 does not correspond to the desired initial position, a message may be displayed to check or re-set motor 120. Each motor 130, 140, 150, 160, 170, 180 may have a corresponding proximity sensor and flag. Flag 125 may be, for example, a small metal feature or magnet mounted on motor 120 or corresponding driven press component, pull roller 20. If flag 125 is mounted on a driven press component, in this example, pull roller 20, the actual position of pull roller 20 is compared to a desired initial position of pull roller 20 to determine proper synchronization.

Figure 5:
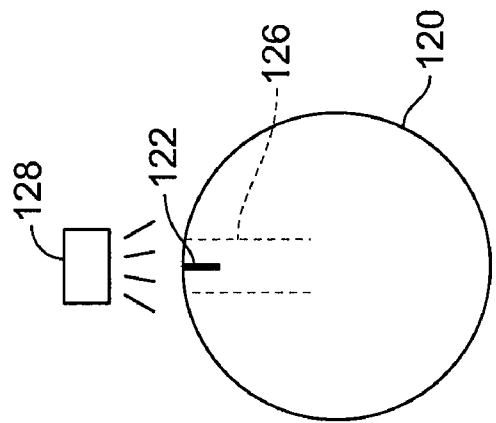

Another preferred embodiment shown in FIG. 5 may include a camera 128 capturing a digital image of motor 120 and sending the digital image to GUI 110. The operator may be able to inspect both the electrical and mechanical zero positions of motor 120. From GUI 110, the operator can determine if marker 122 is within an acceptable tolerance 126. Each motor 120, 130, 140, 150, 160, 170, 180 may have a corresponding camera.

Figure 6:
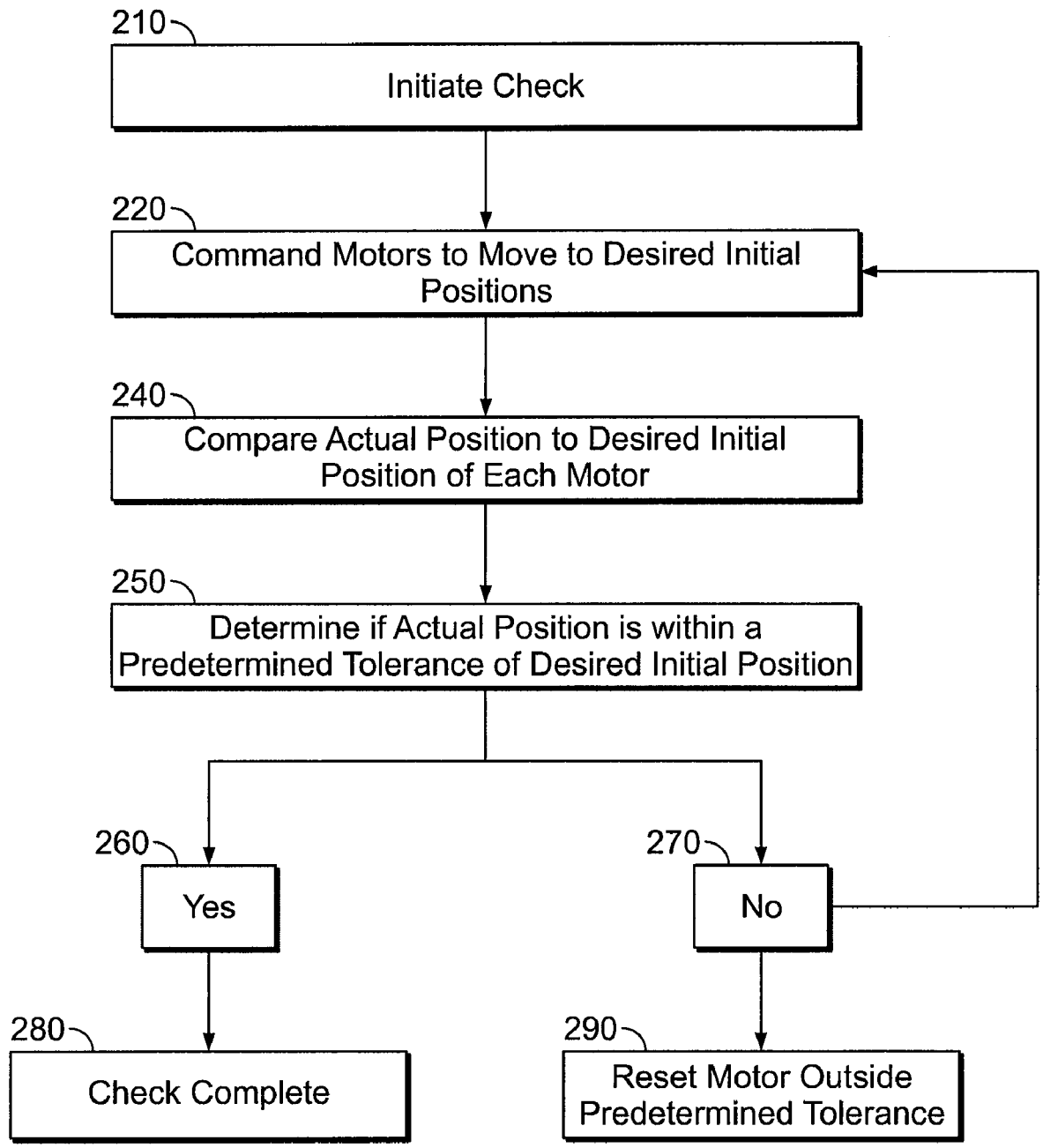

As shown in FIGS. 2 and 6, an operator may select a command 210 through a GUI 110 which allows the operator to check initial positions of each motor 120, 130, 140, 150, 160, 170, 180 in multi-drive printing press 200. Motors 120, 130, 140, 150, 160, 170, 180 may be grouped together so the operator may choose a group of motors to work with simultaneously or the operator may select which motors 120, 130, 140, 150, 160, 170, 180 to check each time a check is performed. In addition, each motor 120, 130, 140, 150, 160, 170, 180 may be checked individually.

Next, the operator commands motors to move to the respective, desired, initial positions 220. The operator establishes the accuracy of the motor's position 230 by determining the actual position of each motor 240 and comparing the actual position to the desired initial position of the motor 250. The operator then determines if the motor's actual position is within an acceptable tolerance of the desired initial position 260. If the actual position of any motor is not within an acceptable tolerance of the desired initial position 280, the operator may initiate a re-zero of that motor 220 by commanding the motor to move the initial position 220. If all of the initial positions for each motor are correct 270, the operator may eliminate initial positioning as a cause of the problem and the check is complete 290.

Any desired combination of indicating devices, including visual markers, proximity sensors, and cameras, may be used on motors.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method for determining accuracy of an actual position of a plurality of independent motors in a printing press compared to a desired initial position for each motor, each desired initial position having an electrical component and a mechanical component, the method comprising the steps of:
   commanding each of the plurality of motors in the printing press via a controller to move to a desired initial position based on the electrical component of the desired initial position;
   comparing an actual position of each motor to the mechanical component of the desired initial position of each motor;
   determining if the actual position of each motor is within a predetermined tolerance of the mechanical component of the desired initial position; and
   resetting any motor outside the predetermined tolerance to be within the predetermined tolerance.

2. The method as recited in claim 1 further comprising providing a graphic user interface to run the commanding step.

3. The method as recited in claim 1 wherein comparing the actual position and the mechanical component of the desired initial position includes an operator visually inspecting a position marker moved by the motor and a reference marker.

4. The method as recited in claim 3 wherein the position marker is a flag.

5. The method as recited in claim 3 wherein the position marker is on the motor.

6. The method as recited in claim 5 wherein the position marker is an actual, visible mark on the motor.

7. The method as recited in claim 6 wherein the position marker is a scribed line, a decal or a feature machined onto the motor.

8. The method as recited in claim 1 wherein a sensor determines if the actual position of each motor is within a predetermined tolerance.

9. A method for determining accuracy of an actual position of a plurality of independent motors in a printing press comprising the steps of:

commanding each of the plurality of motors in the printing press via a controller to move to a desired initial position;

comparing an actual position of each motor to the desired initial position of each motor via an operator visually inspecting a position marker moved by the motor and a reference marker, the position marker being on a press component driven by the motor;

determining if the actual position of each motor is within a predetermined tolerance of the desired initial position; and resetting any motor outside the predetermined tolerance to be within the predetermined tolerance.

10. A method for determining accuracy of an actual position of a plurality of independent motors in a printing press comprising the steps of:

commanding each of the plurality of motors in the printing press via a controller to move to a desired initial position;

comparing an actual position of each motor to the desired initial position of each motor by imaging the actual position of the motor with a camera;

determining if the actual position of each motor is within a predetermined tolerance of the desired initial position; and resetting any motor outside the predetermined tolerance to be within the predetermined tolerance.

11. A printing press comprising:

a plurality of printing press components;

a plurality of motors, each motor driving at least one of the printing press components, the plurality of motors each having a desired initial position including an electrical component and a mechanical component;

a controller, the controller commanding each of the plurality of motors to move to the desired initial position based on the electrical component of the desired initial position of each motor; and a position detector for determining an actual position of each motor with respect to the mechanical component of the desired initial position of each motor after each motor is set to the electrical component of the desired initial position.

12. The printing press as recited in claim 11 wherein the position detector is a proximity sensor.

13. The printing press as recited in claim 11 wherein the position detector includes a flag.

14. The printing press as recited in claim 11 wherein the position detector includes a position marker and a reference marker.

15. The printing press as recited in claim 11 further comprising a camera imaging the position detector.

16. The printing press as recited in claim 11 wherein the position detector is mounted on a driven press component.

17. The printing press as recited in claim 11 further comprising a controller comparing the actual position of each motor to the desired initial position of each motor.

18. The printing press as recited in claim 17 further comprising a graphic user interface connected to the controller for comparing the actual position of each motor to the desired initial position of each motor.

19. The printing press as recited in claim 11 wherein the position marker is an actual, visible mark on the motor.

20. The printing press as recited in claim 19 wherein the position marker is a scribed line, a decal or a feature machined onto the motor.

* * * * *